United States Patent
Kawasaki et al.

(10) Patent No.: US 12,391,086 B2
(45) Date of Patent: Aug. 19, 2025

(54) CONTROL DEVICE, VEHICLE, ESTIMATION METHOD, AND STORAGE MEDIUM

(71) Applicant: HONDA MOTOR CO., LTD., Tokyo (JP)

(72) Inventors: Yohei Kawasaki, Tokyo (JP); Yosuke Wada, Tokyo (JP); Shunichi Miyagishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/784,040

(22) Filed: Jul. 25, 2024

(65) Prior Publication Data
US 2024/0399812 A1    Dec. 5, 2024

Related U.S. Application Data

(63) Continuation of application No. PCT/JP2023/003187, filed on Feb. 1, 2023.

(30) Foreign Application Priority Data

Feb. 1, 2022    (JP) ................................ 2022-014410

(51) Int. Cl.
*B60G 17/016*    (2006.01)
*B62J 45/412*    (2020.01)
(Continued)

(52) U.S. Cl.
CPC ........ *B60G 17/0162* (2013.01); *B62J 45/412* (2020.02); *B62J 45/414* (2020.02);
(Continued)

(58) Field of Classification Search
CPC ............ B60G 17/0162; B60G 2300/12; B60G 2400/0511; B60G 2400/0513;
(Continued)

(56) References Cited

U.S. PATENT DOCUMENTS 10,106,008 B2    10/2018    Nedachi et al.
11,230,155 B2    1/2022    Tokuhara
(Continued)

FOREIGN PATENT DOCUMENTS

EP    1930233 A2    6/2008
JP    2008-137573 A    6/2008
(Continued)

OTHER PUBLICATIONS

International Search Report for PCT/JP2023/003187 mailed Apr. 11, 2023 with partial English Translation.

*Primary Examiner* — Toan C To
(74) *Attorney, Agent, or Firm* — Thomas Horstemeyer, LLP

(57) ABSTRACT

The present invention provides a control device that controls a suspension mechanism of a straddle type vehicle, comprising: a wheel speed sensor configured to detect a wheel speed of the straddle type vehicle; an estimation unit configured to estimate a stroke speed of the suspension mechanism, based on a change in the wheel speed detected by the wheel speed sensor; and a correction unit configured to correct the stroke speed estimated by the estimation unit, in accordance with a circumferential length of a grounding part of a tire changed by turning of the straddle type vehicle.

11 Claims, 5 Drawing Sheets

(51) Int. Cl.
  *B62J 45/414* (2020.01)
  *B62K 25/04* (2006.01)
(52) U.S. Cl.
  CPC .......... *B62K 25/04* (2013.01); *B60G 2300/12* (2013.01); *B60G 2400/0511* (2013.01); *B60G 2400/0513* (2013.01); *B60G 2400/104* (2013.01); *B60G 2400/202* (2013.01); *B60G 2400/208* (2013.01); *B62K 2025/044* (2013.01)
(58) Field of Classification Search
  CPC ........ B60G 2400/104; B60G 2400/202; B60G 2400/208; B62J 45/412; B62J 45/414; B62K 25/04; B62K 2025/044
  See application file for complete search history.

(56) References Cited

U.S. PATENT DOCUMENTS

| | | | | |
|---|---|---|---|---|
| 11,987,089 | B2 * | 5/2024 | Konada | B60G 17/018 |
| 2014/0336894 | A1 * | 11/2014 | Kikuchi | B60W 10/184 |
| | | | | 701/70 |
| 2015/0046034 | A1 * | 2/2015 | Kikuchi | B60G 17/018 |
| | | | | 701/37 |
| 2016/0272033 | A1 | 9/2016 | Nedachi et al. | |
| 2016/0339923 | A1 * | 11/2016 | Koumura | B60G 17/06 |
| 2020/0070613 | A1 | 3/2020 | Tokuhara | |
| 2020/0198431 | A1 * | 6/2020 | Isshiki | B60G 17/018 |
| 2021/0382185 | A1 * | 12/2021 | Furuta | B60C 23/02 |
| 2022/0185052 | A1 * | 6/2022 | Kanda | B60G 17/06 |
| 2023/0106267 | A1 * | 4/2023 | Kawasaki | B62K 25/04 |
| | | | | 280/6.157 |

FOREIGN PATENT DOCUMENTS

| | | | |
|---|---|---|---|
| JP | 2016-022830 | A | 2/2016 |
| JP | 2016-175467 | A | 10/2016 |
| JP | 6130816 | B2 | 5/2017 |
| JP | 2019-014388 | A | 1/2019 |
| WO | 2013/066159 | A1 | 5/2013 |
| WO | 2023/149465 | A1 | 8/2023 |

* cited by examiner

CONTROL DEVICE, VEHICLE, ESTIMATION METHOD, AND STORAGE MEDIUM

CROSS-REFERENCE TO RELATED APPLICATIONS

This application is a continuation of International Patent Application No. PCT/JP2023/003187 filed on Feb. 1, 2023, which claims priority to and the benefit of Japanese Patent Application No. 2022-014410 filed on Feb. 1, 2022, the entire disclosures of which are incorporated herein by reference.

BACKGROUND OF THE INVENTION

Field of the Invention

The present invention relates to a control technique of a vehicle.

Description of the Related Art

In these years, in order to improve steering stability and riding comfort, a suspension mechanism of a damping force variable type capable of variably controlling damping force is used on a vehicle, and so-called skyhook control for controlling the damping force of the suspension mechanism using a skyhook theory can be conducted (see Japanese Patent No. 6130816). As a method for controlling the damping force of the suspension mechanism, there are known methods such as a method for changing the viscosity of a magneto-rheological fluid used as hydraulic oil, and a method for changing the diameter of an orifice through which the hydraulic oil passes. However, in the suspension mechanism, even in a case where the viscosity of the magneto-rheological fluid or the diameter of the orifice is constant, the damping force changes in accordance with a stroke speed. Hence, it is important to accurately obtain the stroke speed in order to accurately conduct the skyhook control.

Japanese Patent No. 6130816 describes a method for obtaining a stroke speed of a four-wheeled vehicle. On the other hand, in a straddle type vehicle (for example, a two-wheeled vehicle), a tread surface of a tire has a curved shape, and thus a circumferential length of a grounding part of the tire changes in accordance with turning of the straddle type vehicle, and an error may occur in the stroke speed in accordance with a change in the circumferential length. That is, in the straddle type vehicle, in a case where it is possible to obtain the stroke speed of the suspension mechanism in a more accurate manner, there is room for further improving the steering stability and the riding comfort.

SUMMARY OF THE INVENTION

The present invention provides, for example, a technique capable of accurately obtaining a stroke speed of a suspension mechanism of a straddle type vehicle.

According to the present invention, there is provided a control device that controls a suspension mechanism of a straddle type vehicle, comprising: a wheel speed sensor configured to detect a wheel speed of the straddle type vehicle; an estimation unit configured to estimate a stroke speed of the suspension mechanism, based on a change in the wheel speed detected by the wheel speed sensor; and a correction unit configured to correct the stroke speed estimated by the estimation unit, in accordance with a circumferential length of a grounding part of a tire changed by turning of the straddle type vehicle.

Further features of the present invention will become apparent from the following description of exemplary embodiments with reference to the attached drawings.

DESCRIPTION OF THE EMBODIMENTS

Figure 1:
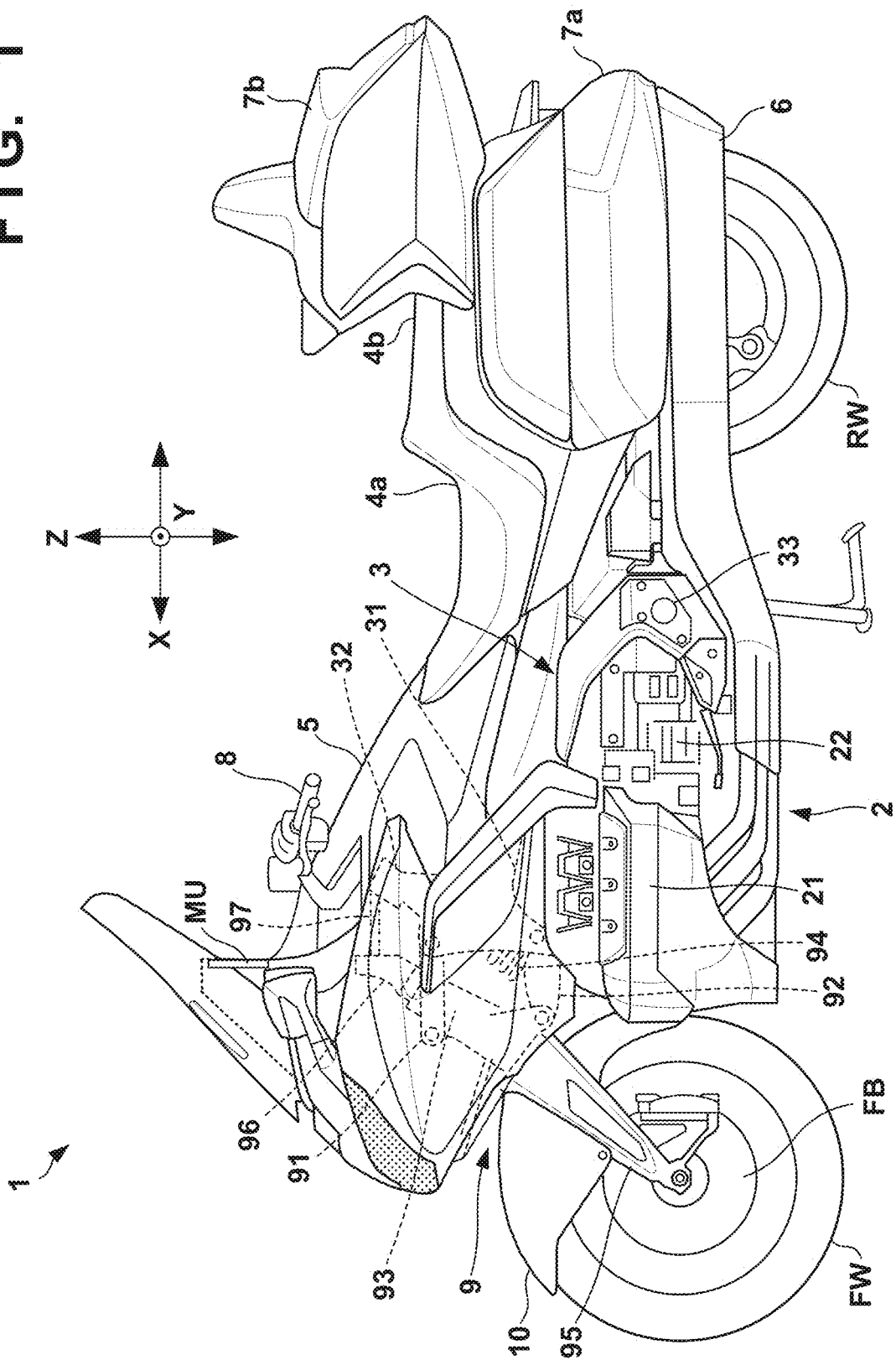
FIG. 1 is a left side view of a straddle type vehicle.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

[Outline of Straddle Type Vehicle]

FIG. 1 is a left side view of a straddle type vehicle 1 according to an embodiment of the present invention. In FIG. 1, arrows X, Y, and Z indicate directions orthogonal to one another. X direction indicates a front-and-rear direction of the straddle type vehicle 1, Y direction indicates a vehicle width direction (left-and-right direction) of the straddle type vehicle 1, and Z direction indicates an up-and-down direction of the straddle type vehicle 1. Hereinafter, an example in which a control device according to the present invention is applied to a two-wheeled motor vehicle as the straddle type vehicle 1 will be described. However, the control device according to the present invention is applicable to other types of straddle type vehicles such as three-wheeled vehicles, and is also applicable to electric vehicles with motors as drive sources, in addition to vehicles with internal combustion engines as the drive sources. Note that in the following, the straddle type vehicle 1 will be referred to as the vehicle 1, in some cases.

The vehicle 1 includes a power unit 2 between a front wheel FW and a rear wheel RW. The power unit 2 includes an engine 21 and a transmission 22. Drive force of the transmission 22 is transmitted to the rear wheel RW via a drive shaft, not illustrated, to rotate the rear wheel RW.

The power unit 2 is supported by a vehicle body frame 3. The vehicle body frame 3 includes a pair of left and right main frames 31, which extend in X direction. A fuel tank 5 and an air cleaner box (not illustrated) are disposed above the main frames 31. A meter unit MU for displaying various types of information to an occupant (rider) is provided on a front side of the fuel tank 5.

On front end portions of the main frames 31, a head pipe 32, which rotatably supports a steering shaft (not illustrated) to be rotated by a handlebar 8, is provided. On rear end portions of the main frames 31, a pair of left and right pivot plates 33 are respectively provided. Lower end portions of the pivot plates 33 and front end portions of the main frames 31 are connected by a pair of left and right lower arms (not illustrated), and the power unit 2 is supported by the main frames 31 and the lower arms. A pair of left and right seat rails that extend rearward are also provided at the rear end portions of the main frames 31, and a seat 4a, on which a rider is seated, a seat 4b on which a passenger is seated, a rear trunk 7b, and the like are supported on the seat rails.

A front end portion of a rear swing arm (not illustrated) that extends in the front-and-rear direction is swingably supported by the pivot plates 33. The rear swing arm is swingable in the up-and-down direction, and the rear wheel RW is supported on its rear end portion. An exhaust muffler 6, which muffles exhaust of the engine 21, extends in X direction on a lower lateral side of the rear wheel RW. On upper lateral sides of the rear wheel RW, left and right saddlebacks 7a are respectively provided.

In the front end portions of the main frames 31, a front suspension mechanism 9, which swingably supports the front wheel FW, is constituted. The front suspension mechanism 9 includes an upper link 91, a lower link 92, a fork support body 93, a vibration reduction mechanism 94 (cushion unit), and a pair of left and right front forks 95. In the front suspension mechanism 9, the upper link 91, the lower link 92, the fork support body 93, and the vibration reduction mechanism 94 constitute a support mechanism for supporting the front forks 95 of the vehicle 1.

The upper link 91 and the lower link 92 are vertically disposed in the front end portions of the main frames 31. Rear end portions of the upper link 91 and the lower link 92 are swingably coupled with the front end portions of the main frames 31, respectively. The upper link 91 and the lower link 92 are swingably coupled with the fork support body 93.

The fork support body 93 has a tubular shape, and is inclined rearward. A steering shaft 96 is supported by the fork support body 93 so as to be rotatable about the axis of the steering shaft 96. The steering shaft 96 includes a shaft portion (not illustrated) into which the fork support body 93 is inserted. A bridge (not illustrated) is provided in a lower end portion of the steering shaft 96, and the pair of left and right front forks 95 are supported by such a bridge. The front forks 95 rotatably support the front wheel FW, and also supports a front brake FB. An upper end portion of the steering shaft 96 is coupled with a steering shaft (not illustrated) rotated by the handlebar 8 via a link 97. An upper portion of the front wheel FW is covered with a fender 10, and the fender 10 is supported by the front forks 95.

Figure 2:
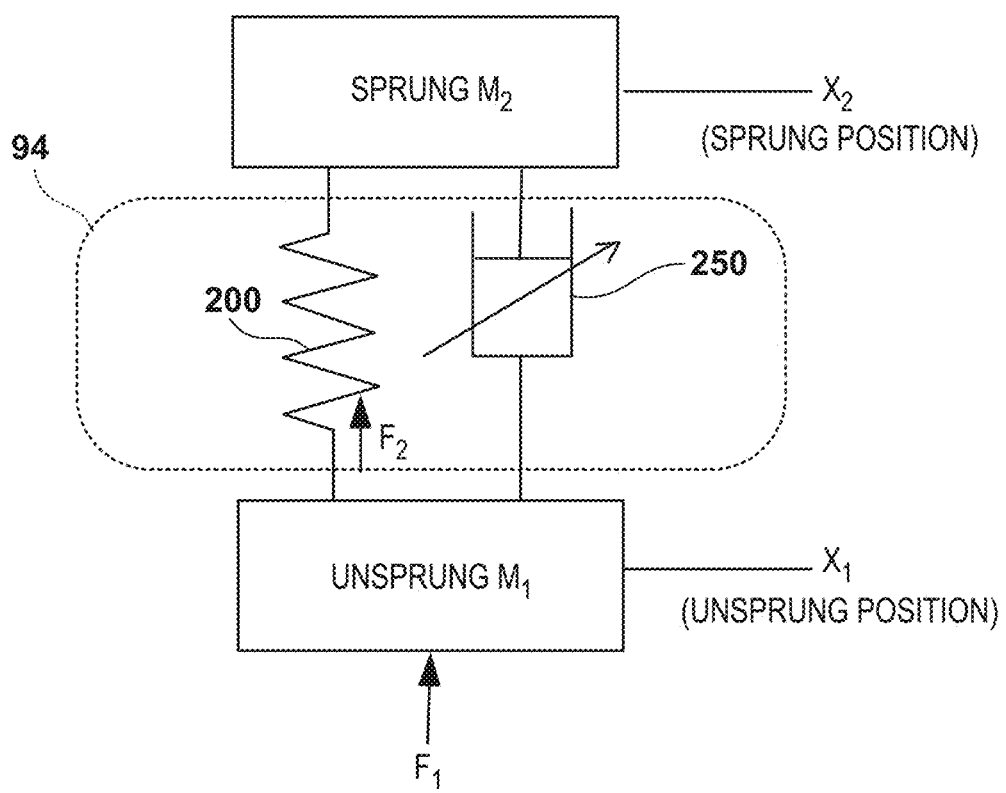
FIG. 2 is a diagram in which a vibration reduction mechanism is modeled.

Next, the vibration reduction mechanism 94 of the front suspension mechanism 9 will be described. FIG. 2 is a diagram in which the vibration reduction mechanism 94 is modeled. The vibration reduction mechanism 94 is a mechanism for reducing vibrations transmitted from the road (ground) to the vehicle 1 (vehicle body), and includes an elastic member 200 and a viscosity damping member 250. As illustrated in FIG. 1, the vibration reduction mechanism 94 is swingably supported at its upper end portion by the main frames 31, and is swingably supported at its lower end portion by the lower link 92.

In FIG. 2, an unsprung mass M1 denotes a mass of the lower link 92, by which a lower end of the vibration reduction mechanism 94 is supported, and constituent members connected with the lower link 92 (for example, the front wheel FW, the front brake FB, and the like). In addition, a sprung mass M2 denotes a mass of the main frames 31, by which an upper portion of the vibration reduction mechanism 94 is supported, and constituent members connected with the main frames 31 (for example, the vehicle body). A load F1 denotes a grounding load (grounding load variation) to be input into the vibration reduction mechanism 94 by the rotation of the front wheel FW from a grounding part of the front wheel FW. A load F2 denotes a load (compression force) exerted on the elastic member 200. In addition, a position X1 indicates a position in the up-and-down direction of the unsprung mass M1 (an unsprung position) in the vibration reduction mechanism 94. Further, a position X2 indicates a position in the up-and-down direction of the sprung mass M2 (a sprung position) in the vibration reduction mechanism 94.

The elastic member 200 is a member having a spring constant. A spring or rubber is used as the elastic member 200, and a coil spring can be used in the present embodiment. In addition, the viscosity damping member 250 is of a mono-tube type, although its detailed illustration is omitted, and may include a magneto-rheological fluid (MRF) as the hydraulic oil. A piston rod is slidably inserted in an axial direction into a cylinder having a tubular shape in which the MRF is filled, and the inside of the cylinder is partitioned into an upper oil chamber and a lower oil chamber by a piston attached to a tip end of the piston rod. When an electric current is supplied to a coil located inside a communication passage that communicates the upper oil chamber with the lower oil chamber, a magnetic field is applied to the MRF, which flows in the communication passage, and ferromagnetic particles form clusters. This changes the viscosity of the MRF, which passes through the communication passage, so that the damping force of the viscosity damping member 250 can be changed. Note that the viscosity damping member 250 is not limited to a mechanism using the magneto-viscous fluid (MRF), and may also be a mechanism that changes the amount of oil (hydraulic oil) passing through an orifice by changing the diameter of the orifice with use of a step motor or the like, so as to adjust the damping force.

[Configuration of Control Device]

Figure 3:
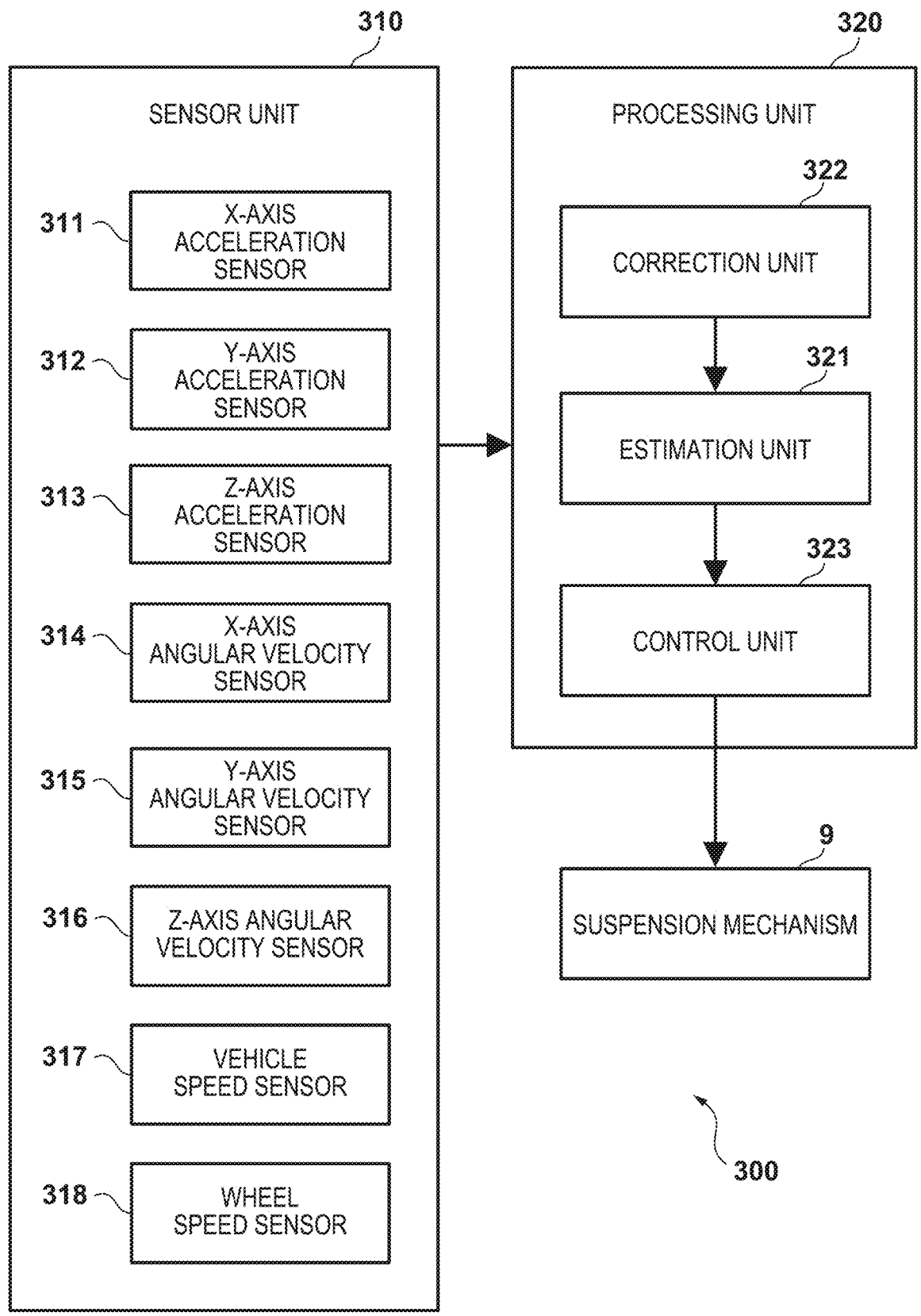
FIG. 3 is a diagram illustrating a configuration example of a control device.

FIG. 3 is a diagram illustrating a configuration example of a control device 300 according to the present embodiment. The control device 300 is a device that controls the suspension mechanism 9 of the vehicle 1, and may include a sensor unit 310 and a processing unit 320.

The sensor unit 310 includes an inertial measurement unit (IMU: Internal Measurement Unit), which detects acceleration and an angular velocity generated in the vehicle 1, and which is thus capable of detecting an attitude of the vehicle 1. The inertial measurement unit is disposed at any appropriate position of the vehicle 1, for example, in the vicinity of the center of gravity of the vehicle 1. In the case of the present embodiment, in the sensor unit 310, acceleration sensors 311 to 313, each of which detects translational acceleration of the vehicle 1, and angular velocity sensors 314 to 316, each of which detects an angular velocity of the vehicle 1, are provided as inertial measurement units. The X-axis acceleration sensor 311 detects translational acceleration in the front-and-rear direction (X-axis direction) of the vehicle 1, the Y-axis acceleration sensor 312 detects translational acceleration in the vehicle width direction (Y-axis direction) of the vehicle 1, and the Z-axis acceleration sensor 313 detects translational acceleration in the up-and-down direction (Z-axis direction) of the vehicle 1. The X-axis angular velocity sensor 314 detects an angular velocity around X-axis, the Y-axis angular velocity sensor 315 detects an angular velocity around Y-axis, and the Z-axis angular velocity sensor 316 detects an angular velocity around Z-axis. In addition, the sensor unit 310 includes a vehicle speed sensor 317, which detects the speed of the vehicle 1, and a wheel speed sensor 318, which detects the wheel speed of the vehicle 1. The wheel speed sensor 318 in the present embodiment can be configured to be capable of detecting the wheel speed of the front wheel FW, but may be configured to be also capable of detecting the wheel speed of the rear wheel RW. Note that in the following, the translational acceleration in the vehicle width direction of the vehicle 1 detected by the Y-axis acceleration sensor 312 will be referred to as "lateral acceleration", and the angular velocity in a yaw direction (a rotation direction around Z axis) of the vehicle 1 detected by the Z-axis angular velocity sensor 316 will be referred to as "a yaw angular velocity", in some cases.

The processing unit 320 is, for example, an electronic control unit (ECU), and may include a computer including a processor represented by a CPU, a storage device such as semiconductor memory, and an interface with external devices. The storage device (memory) of the processing unit 320 stores an application program (hereinafter, referred to as a control program, in some cases) for controlling the suspension mechanism 9 of the vehicle 1, and the processor of the processing unit 320 can read and execute the control program stored in the storage device. Here, the control program includes a program for estimating the stroke speed of the suspension mechanism 9 of the vehicle 1. In addition, the control program may be stored in a storage medium such as a CD-ROM, a DVD, or a memory to be installed in the processing unit 320 from the storage medium, or may be downloaded from an external server through a network to be installed in the processing unit 320.

In the case of the present embodiment, the processing unit 320 can include an estimation unit 321, a correction unit 322, a control unit 323, and the correction unit 322. The estimation unit 321 estimates the stroke speed of the suspension mechanism 9 of the vehicle 1, based on detection results in the sensor unit 310. The correction unit 322 corrects the stroke speed estimated by the estimation unit 321. The control unit 323 controls the suspension mechanism 9, based on the stroke speed corrected by the correction unit 322. In the case of the present embodiment, from the viewpoint of improving the steering stability and the riding comfort of the vehicle 1, the control unit 323 conducts so-called skyhook control for controlling the damping force of the vibration reduction mechanism 94 (the viscosity damping member 250) by using the skyhook theory, which assumes that the vehicle 1 (the vehicle body and the like) is suspended in midair by a virtual line. Specifically, by supplying an electric current to a coil of the viscosity damping member 250 of the vibration reduction mechanism 94 to change the viscosity of the magnetic fluid inside the viscosity damping member 250, the control unit 323 is capable of controlling the damping force of the vibration reduction mechanism 94, that is, conducting the skyhook control. In addition, in a case where a mechanism that changes the diameter of an orifice through which oil passes is used as the viscosity damping member 250, the control unit 323 may change the diameter of the orifice of the viscosity damping member 250 to change the amount of oil that passes through the orifice, and may control the damping force of the vibration reduction mechanism 94.

Here, the tires of the straddle type vehicle 1 are not planar ones like the tires of a four-wheeled vehicle, and the tires each have a curved tread surface. For this reason, the circumferential length of the grounding part of the tire (the front wheel FW) of the straddle type vehicle 1 changes in accordance with turning of the straddle type vehicle 1, and an error may occur in the stroke speed in accordance with a change in the circumferential length. That is, in the straddle type vehicle 1, in a case where it is possible to obtain the stroke speed of the suspension mechanism 9 in a more accurate manner, there is room for further improving the steering stability and the riding comfort. For such a purpose, the correction unit 322 in the present embodiment corrects the stroke speed estimated by the estimation unit 321 in accordance with the circumferential length of the grounding part of the tire that changes in accordance with turning of the vehicle 1.

Figure 4:
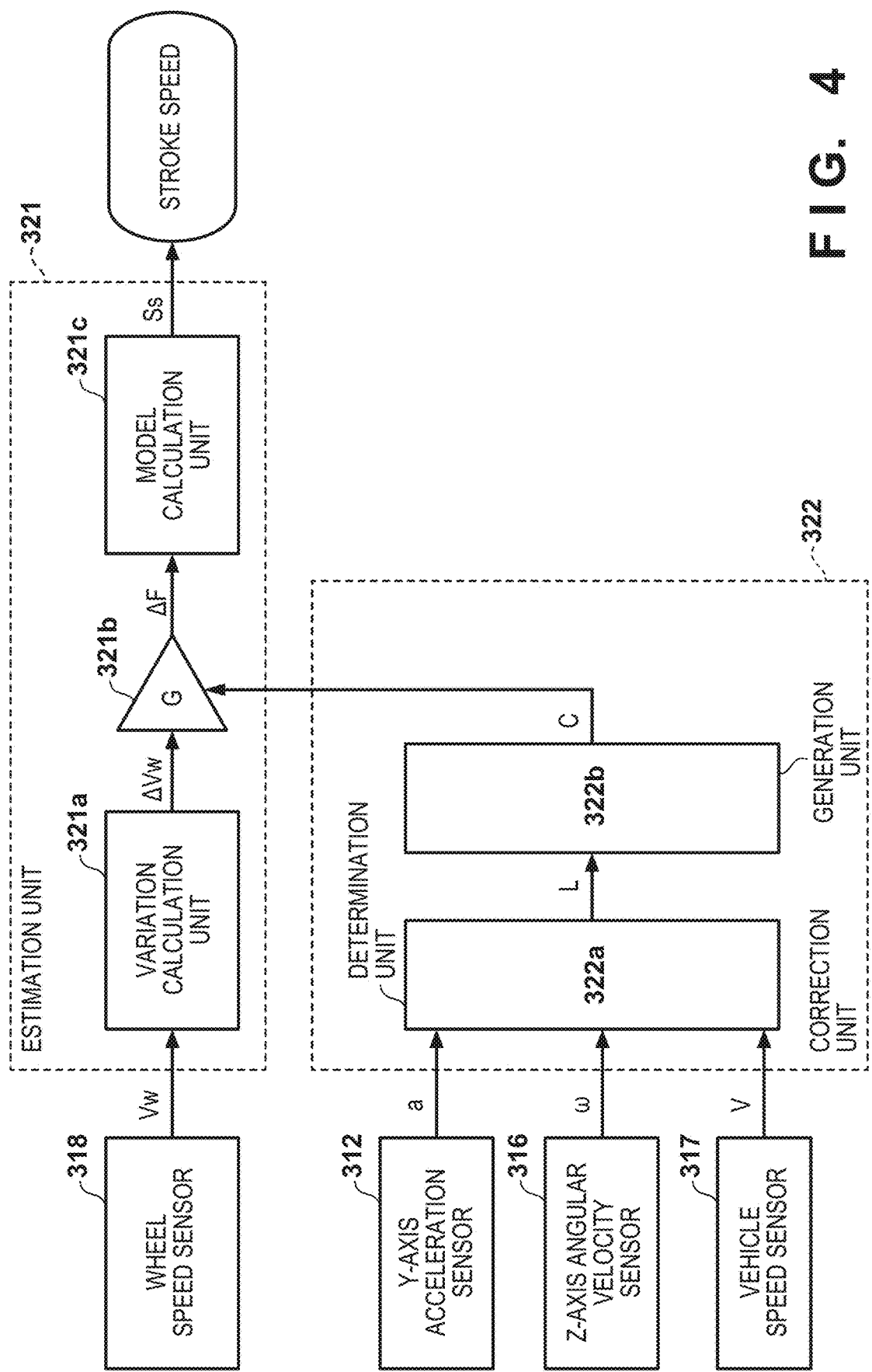
FIG. 4 is a block diagram illustrating estimation of a stroke speed in the control device.
Figure 5:
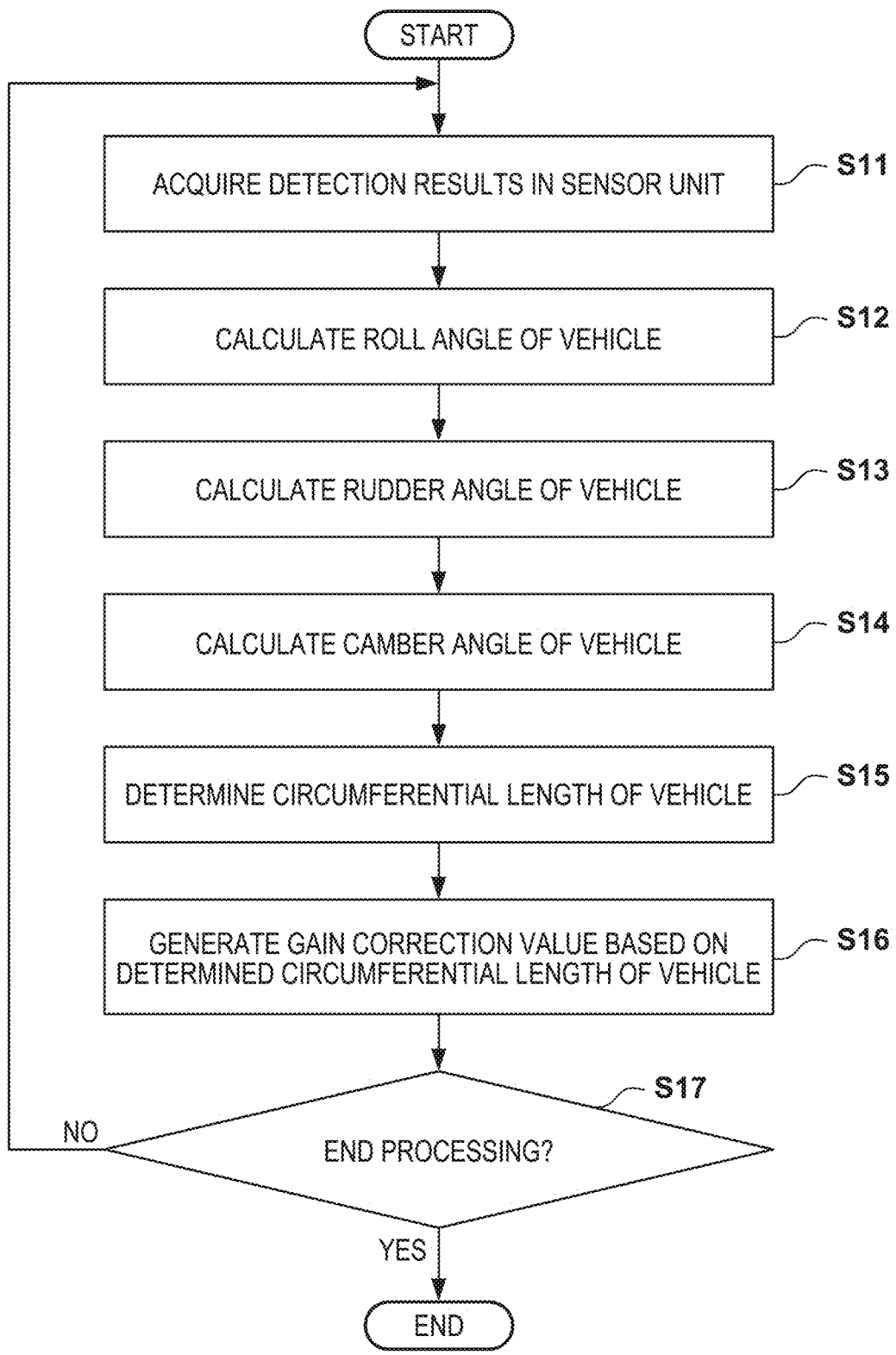
FIG. 5 is a flowchart illustrating processing performed by a correction unit of the control device.

Hereinafter, estimation of the stroke speed by the control device 300 in the present embodiment will be described with reference to FIGS. 4 and 5. FIG. 4 is a block diagram illustrating estimation of the stroke speed by the control device 300 in the present embodiment. FIG. 5 is a flowchart illustrating processing (that is, processing of generating a correction coefficient C) performed by the correction unit 322 of the control device 300.

First, processing of the estimation unit 321 will be described with reference to FIG. 4. The estimation unit 321 includes a variation calculation unit 321a, a gain multiplication unit 321b, and a model calculation unit 321c, and estimates the stroke speed of the suspension mechanism 9 of the vehicle 1, based on detection results in the sensor unit 310.

The variation calculation unit 321a calculates (outputs) a wheel speed variation $\Delta Vw$ [rad/s] of the vehicle 1, based on a wheel speed $Vw$ [rad] of the vehicle 1 that has been detected by the wheel speed sensor 318. For example, by using a bandpass filter, the variation calculation unit 321a passes frequency components in a specified band (for example, 0.5 Hz to 5 Hz) from a signal of the wheel speed $Vw$ that has been detected by the wheel speed sensor 318, and is thus capable of calculating the wheel speed variation $\Delta Vw$. In the present embodiment, the signal of the wheel speed $Vw$ is input from the wheel speed sensor 318 at a cycle of approximately 10 msec to 20 msec. The bandpass filter has a low-pass characteristic of passing frequency components lower than 5 Hz in order to block high-frequency components from the signal and to reliably make available frequency components in a resonance band of the sprung mass M2 (a signal in a frequency band corresponding to the vibration of the sprung mass M2). When the signal of the wheel speed $Vw$ is input from the wheel speed sensor 318 at a shorter cycle, the bandpass filter may have a low-pass characteristic in a higher band, for example, 20 Hz so as to be also capable of extracting a frequency component in a resonance band of the unsprung mass M1. In addition, the bandpass filter has a high-pass characteristic that passes frequency components higher than 0.5 Hz to remove a DC component from the signal of the wheel speed $Vw$ and to also remove a vehicle body speed component (a vehicle body speed component by braking and driving force) caused by an operation or the like by the driver.

The gain multiplication unit 321b multiplies the wheel speed variation $\Delta Vw$, which has been calculated by the variation calculation unit 321a, by a coefficient (gain G) as expressed in the following Formula (1), and calculates (outputs) a grounding load variation $\Delta F$ [N]. The grounding load variation $\Delta F$ denotes a variation of the unsprung mass M2, and the gain G can be set beforehand by performing an experiment, a simulation, or the like, with use of the fact that the wheel speed variation $\Delta Vw$ and a variation of the unsprung mass M1 have a certain correlation, in a state in which the straddle type vehicle 1 is upright (not inclined). In addition, the coefficient C in the following Formula (1)

denotes a correction coefficient (correction value) to be multiplied by the gain G in order to correct the stroke speed estimated by the estimation unit 321, and is generated by the correction unit 322 to be described later. In the following, the coefficient C will be referred to as a correction coefficient C, in some cases.

$$\Delta F = \Delta V w \times G \times C \qquad (1)$$

The model calculation unit 321c calculates (outputs) a stroke speed Ss of the suspension mechanism 9, based on the grounding load variation ΔF, which has been calculated by the gain multiplication unit 321b in accordance with a predetermined model. The predetermined model serves as a model in which input is set with the grounding load variation ΔF, which has been calculated by the gain multiplication unit 321b, and output is set with the stroke speed of the suspension mechanism 9, and the model can be generated beforehand in an experiment, a simulation, or the like. As an example of the predetermined model, it is possible to refer to Patent Literature 1 described above.

Next, processing of the correction unit 322 will be described with reference to FIGS. 4 and 5. The correction unit 322 includes a determination unit 322a and a generation unit 322b, and corrects the stroke speed estimated by the estimation unit 321 in accordance with the circumferential length of the grounding part of the tire (the front wheel FW) changed by turning of the vehicle 1. The determination unit 322a determines a circumferential length L of the grounding part of the tire that changes in accordance with turning of vehicle 1, based on detection results in the sensor unit 310 (for example, lateral acceleration a, which has been detected by the Y-axis acceleration sensor 312, a yaw angular velocity @, which has been detected by the Z-axis angular velocity sensor 316, and the vehicle speed V, which has been detected by vehicle speed sensor 317). The generation unit 322b generates a correction coefficient C (correction value) for correcting the stroke speed estimated by the estimation unit 321, based on the circumferential length L, which has been determined by the determination unit 322a. The correction coefficient C, which has been generated by the generation unit 322b, is multiplied by the gain G in order to correct the gain G of the gain multiplication unit 321b. Hereinafter, the processing of the correction unit 322 will be specifically described along the flowchart illustrated in FIG. 5.

In step S11, the correction unit 322 (the determination unit 322a) acquires detection results in the sensor unit 310. In the case of the present embodiment, the determination unit 322a acquires the acceleration in the vehicle width direction of the vehicle 1 that has been detected by the Y-axis acceleration sensor 312 and the speed of the vehicle 1 (the vehicle speed) that has been detected by the vehicle speed sensor 317, as the detection results in the sensor unit 310.

In step S12, the correction unit 322 (the determination unit 322a) calculates a roll angle of the vehicle 1, based on the acceleration in the vehicle width direction of the vehicle 1 that has been detected by the Y-axis acceleration sensor 312. For example, the determination unit 322a has information (hereinafter, referred to as roll angle information, in some cases) indicating a correspondence relationship between the acceleration in the vehicle width direction of the vehicle 1 and the roll angle of the vehicle 1, and is capable of obtaining the roll angle of the vehicle 1 from the acceleration in the vehicle width direction of the vehicle 1 that has been detected by the Y-axis acceleration sensor 312, based on the roll angle information. Note that the roll angle information is created beforehand in an experiment, a simulation, or the like, and is stored, as a table or a function, in the storage device of the processing unit 320.

In step S13, the correction unit 322 (the determination unit 322a) obtains a turning radius of the vehicle 1, based on an angular velocity (a yaw angular velocity) in the yaw direction of the vehicle 1 that has been detected by the Z-axis angular velocity sensor 316 and the vehicle speed of the vehicle 1 that has been detected by the vehicle speed sensor 317, and calculates a rudder angle (a steering angle) of the vehicle 1.

Here, a method for calculating the turning radius of the vehicle 1 will be described. In each formula to be described below, "V" denotes the vehicle speed [m/s], which has been detected by the vehicle speed sensor 317. "@" denotes the yaw angular velocity [rad/s], which has been detected by the Z-axis acceleration sensor 316. In addition, "R" denotes the turning radius [m] of the vehicle 1, and "m" denotes the weight of the vehicle 1. The weight of the vehicle 1 is known information, and is stored beforehand in the storage device of the processing unit 320.

The angular velocity @ can be expressed by (vehicle speed V/turning radius R), and thus the turning radius R can be expressed by Formula (2). Therefore, by using Formula (2), the determination unit 322a is capable of obtaining the turning radius R of the vehicle 1, based on the yaw angular velocity ω, which has been detected by the Z-axis acceleration sensor 316, and the vehicle speed V, which has been detected by vehicle speed sensor 317.

$$V = R\omega \qquad (2)$$
$$R = V/\omega$$

In addition, the determination unit 322a has information (hereinafter, referred to as rudder angle information, in some cases) indicating a correspondence relationship among the turning radius R, the roll angle, and the rudder angle, and is capable of obtaining the rudder angle of the vehicle 1 from the turning radius R, which has been obtained as described above, and the roll angle obtained in step S12, based on the steering angle information. Note that the rudder angle information is created beforehand in an experiment, a simulation, or the like, and is stored, as a table or a function (matrix), in the storage device of the processing unit 320.

In step S14, the correction unit 322 (the determination unit 322a) calculates a camber angle of the front wheel FW of the vehicle 1, based on the roll angle calculated in step S12 and the rudder angle calculated in step S13. For example, by using the following Formula (3), the determination unit 322a is capable of obtaining the camber angle of the front wheel FW. In Formula (3), "$\theta_{Rf}$" denotes the camber angle [rad] of the front wheel FW, "B" denotes the caster angle [rad] of the vehicle 1, "θR" denotes the roll angle [rad], and "θn" denotes the rudder angle [rad]. The caster angle is defined as an angle formed by the front forks 95 and the ground (a horizontal plane), and is stored beforehand, as known information, in the storage device.

$$\theta_{Rf} = \sin^{-1}(\sin\beta \cdot \cos\theta_R \cdot \sin\theta_H + \sin\theta_R \cdot \cos\theta_H) \qquad (3)$$

In step S15, the correction unit 322 (the determination unit 322a) determines the circumferential length L of the grounding part of the tire of the front wheel FW, based on the camber angle $\theta_{Rf}$ calculated in step S14. For example, the determination unit 322a has information (hereinafter, referred to as circumferential length information, in some cases) indicating a correspondence relationship between the camber angle $\theta_{Rf}$ and the circumferential length L, and is capable of obtaining the circumferential length L from the camber angle $\theta_{Rf}$ calculated in step S14, based on the circumferential length information. The circumferential length information is acquired beforehand by measuring the circumferential length L, while changing the camber angle $\theta_{Rf}$, in a state in which the tire of the front wheel FW is pressed against the ground with a constant load, and is stored, as a table or a function, in the storage device of the processing unit 320.

In step S16, the correction unit 322 (the generation unit 322b) determines a correction coefficient C, based on the circumferential length L determined in step S15. For example, by using the following Formula (4), the generation unit 322b is capable of obtaining the correction coefficient C. In Formula (4), "$L_{base}$" denotes the circumferential length of the grounding part of the tire (the front wheel FW), in a state in which the vehicle 1 is upright, that is, the maximum circumferential length of the tire. The correction coefficient C generated in step S16 is multiplied by the gain G of the gain multiplication unit 321b, as expressed in the above Formula (1).

$$C = L_{base}/L \qquad (4)$$

In step S17, the correction unit 322 determines whether to end the processing. For example, the correction unit 322 is capable of determining to end the processing, when the ignition is turned off by the user (driver). In a case where the correction unit 322 determines not to end the processing, the processing returns to step S11 and repeats steps S11 to S16.

As described above, the control device 300 (the estimation device) in the present embodiment corrects the stroke speed of the suspension mechanism 9, which is estimated, based on the detection results in the sensor unit 310, in accordance with the circumferential length of the grounding part of the tire to be changed by turning of the vehicle 1. This enables the stroke speed of the suspension mechanism 9 of the straddle type vehicle 1 to be accurately obtained, and enables further improvement in the steering stability and the riding comfort of the vehicle 1. In addition, according to the configuration of the vehicle 1 in the present embodiment, it becomes possible to accurately obtain the stroke speed of the suspension mechanism 9 without provision of a sensor that detects the stroke speed, so that such a sensor can be eliminated, and it can be advantageous in terms of the vehicle cost. Here, in the above embodiment, an example of estimating the stroke speed of the suspension mechanism 9, which is provided for the front wheel FW, has been described. However, it is possible to estimate the stroke speed similarly in the suspension mechanism 9, which is provided for the rear wheel RW.

SUMMARY OF EMBODIMENTS

1. A control device of the above-described embodiments is a control device (e.g. 300) that controls a suspension mechanism (e.g. 9) of a straddle type vehicle (e.g. 1), comprising:

a wheel speed sensor (e.g. 318) that detects a wheel speed of the straddle type vehicle;

estimation means (e.g. 321) for estimating a stroke speed of the suspension mechanism, based on a change in the wheel speed detected by the wheel speed sensor; and correction means (e.g. 322) for correcting the stroke speed estimated by the estimation means, in accordance with a circumferential length of a grounding part of a tire changed by turning of the straddle type vehicle.

According to this embodiment, it becomes possible to accurately obtain the stroke speed of the suspension mechanism of the straddle type vehicle, so that the steering stability and the riding comfort of the vehicle can be further improved. In addition, it becomes possible to accurately obtain the stroke speed without provision of a sensor that detects the stroke speed of the suspension mechanism, so that the sensor can be reduced, and it can be advantageous in terms of the vehicle cost.

2. In the above-described embodiments, the estimation means estimates the stroke speed, based on a value obtained by multiplying the change in the wheel speed detected by the wheel speed sensor by a gain (e.g. G), and the correction means corrects the stroke speed by correcting the gain in accordance with the circumferential length.

According to this embodiment, it becomes possible to appropriately correct the stroke speed of the suspension mechanism, so that the stroke speed can be accurately obtained.

3. In the above-described embodiments, the vehicle control device further comprises an acceleration sensor (e.g. 312) that detects acceleration in a vehicle width direction generated in the straddle type vehicle, wherein the correction means includes:
  determination means (e.g. 322a) for calculating a roll angle of the straddle type vehicle based on the acceleration detected by the acceleration sensor, and also determining the circumferential length based on the roll angle; and
  generation means (e.g. 322b) for generating a correction value (e.g. C) for correcting the stroke speed, based on the circumferential length determined by the determination means.

According to this embodiment, it becomes possible to appropriately generate the correction value for correcting the stroke speed of the suspension mechanism.

4. In the above-described embodiments, the vehicle control device further comprises a vehicle speed sensor (e.g. 317) that detects a vehicle speed of the straddle type vehicle; and an angular velocity sensor (e.g. 316) that detects an angular velocity in a yaw direction of the straddle type vehicle, wherein the determination means further calculates a rudder angle of the straddle type vehicle based on the angular velocity detected by the angular velocity sensor and the vehicle speed detected by the vehicle speed sensor, also calculates a camber angle of a wheel of the straddle type vehicle based on the rudder angle and the roll angle, and determines the circumferential length based on the camber angle.

According to this embodiment, it becomes possible to appropriately generate the correction value for correcting the stroke speed of the suspension mechanism.

5. In the above-described embodiments,
the determination means determines the circumferential length from the camber angle, based on information indicating a relationship between the camber angle and the circumferential length.

According to this embodiment, it becomes possible to appropriately generate the correction value for correcting the stroke speed of the suspension mechanism.

6. In the above-described embodiments,
the information is acquired by measuring the circumferential length while changing the camber angle in a state in which the tire is pressed against ground with a constant load.

According to this embodiment, it becomes possible to appropriately acquire the information indicating the relationship between the camber angle and the circumferential length, so that the correction value can be accurately generated, based on the information.

7. In the above-described embodiments,
the control device further comprises control means (e.g. 323) for controlling the suspension mechanism based on the stroke speed corrected by the correction means.

According to this embodiment, it becomes possible to control the suspension mechanism, based on the corrected stroke speed, so that steering stability and riding comfort of the vehicle can be further improved.

8. In the above-described embodiments,
the control means conducts sky-hook control of the straddle type vehicle based on the stroke speed corrected by the correction means.

According to this embodiment, by controlling the suspension mechanism as the skyhook control, based on the corrected stroke speed, the steering stability and the riding comfort of the vehicle can be further improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device that controls a suspension mechanism of a straddled vehicle, comprising:
    a wheel speed sensor configured to detect a wheel speed of the straddled vehicle;
    an estimation unit configured to estimate a stroke speed of the suspension mechanism, based on a change in the wheel speed detected by the wheel speed sensor; and
    a correction unit configured to correct the stroke speed estimated by the estimation unit, in accordance with a circumferential length of a grounding part of a tire changed by turning of the straddled vehicle.

2. The control device according to claim 1, wherein
the estimation unit is configured to estimate the stroke speed, based on a value obtained by multiplying the change in the wheel speed detected by the wheel speed sensor by a gain, and
the correction unit is configured to correct the stroke speed by correcting the gain in accordance with the circumferential length.

3. The vehicle control device according to claim 1, further comprising an acceleration sensor configured to detect acceleration in a vehicle width direction generated in the straddled vehicle, wherein the correction unit is configured to:
    calculate a roll angle of the straddled vehicle based on the acceleration detected by the acceleration sensor, and determine the circumferential length based on the roll angle; and
    generate a correction value for correcting the stroke speed, based on the determined circumferential length.

4. The control device according to claim 3, further comprising:
    a vehicle speed sensor configured to detect a vehicle speed of the straddled vehicle; and
    an angular velocity sensor configured to detect an angular velocity in a yaw direction of the straddled vehicle,
    wherein the determination unit is configured to further calculate a rudder angle of the straddled vehicle based on the angular velocity detected by the angular velocity sensor and the vehicle speed detected by the vehicle speed sensor, calculate a camber angle of a wheel of the straddled vehicle based on the rudder angle and the roll angle, and determine the circumferential length based on the camber angle.

5. The control device according to claim 4, wherein the determination unit is configured to determine the circumferential length from the camber angle, based on information indicating a relationship between the camber angle and the circumferential length.

6. The control device according to claim 5, wherein the information is acquired by measuring the circumferential length while changing the camber angle in a state in which the tire is pressed against ground with a constant load.

7. The control device according to claim 1, further comprising a control unit configured to control the suspension mechanism based on the stroke speed corrected by the correction unit.

8. The control device according to claim 7, wherein the control unit is configured to conduct sky-hook control of the straddled vehicle based on the stroke speed corrected by the correction unit.

9. A vehicle comprising a control device according to claim 1.

10. An estimation method for estimating a stroke speed of a suspension mechanism of a straddled vehicle, comprising:
    detecting a wheel speed of the straddled vehicle;
    estimating the stroke speed, based on a change in the detected wheel speed; and
    correcting the estimated stroke speed, in accordance with a circumferential length of a grounding part of a tire changed by turning of the straddled vehicle.

11. A non-transitory computer-readable storage medium storing a program for causing a computer to perform an estimation method according to claim 10.

* * * * *